April 21, 1942.   J. STURGESS   2,280,106
CABLE TENSION CONTROLLER
Filed Dec. 24, 1940   2 Sheets-Sheet 1
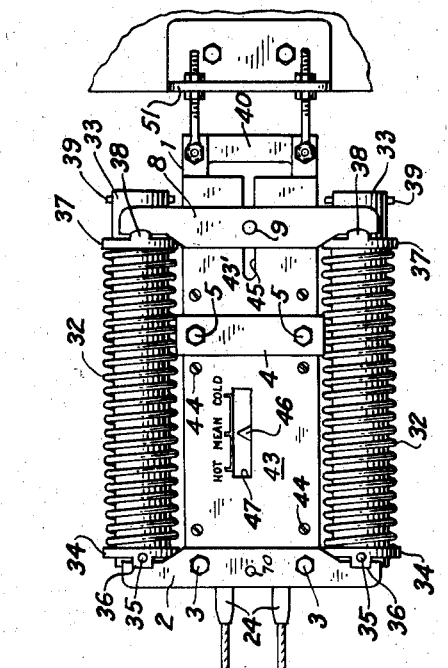
Fig.1.
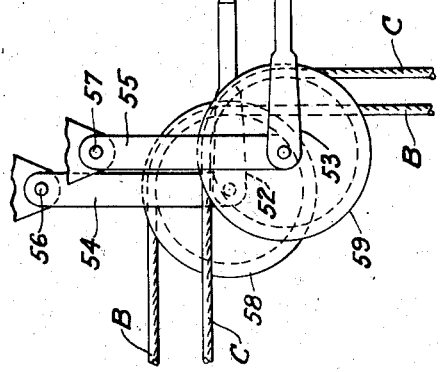
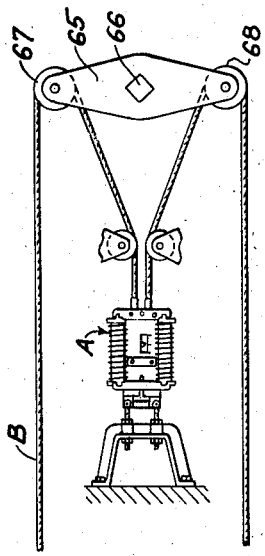
Fig.9.
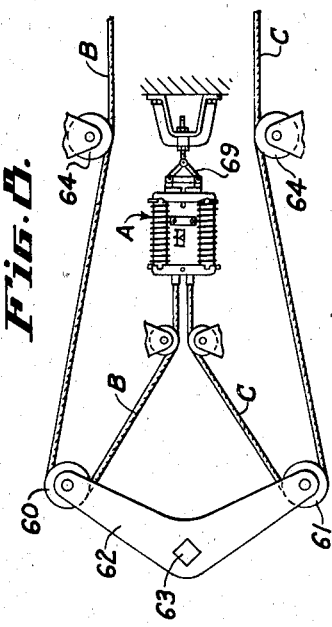
Fig.8.
INVENTOR.
JOHN STURGESS
BY
ATTORNEY.

April 21, 1942.                J. STURGESS                2,280,106
                          CABLE TENSION CONTROLLER
                          Filed Dec. 24, 1940        2 Sheets-Sheet 2
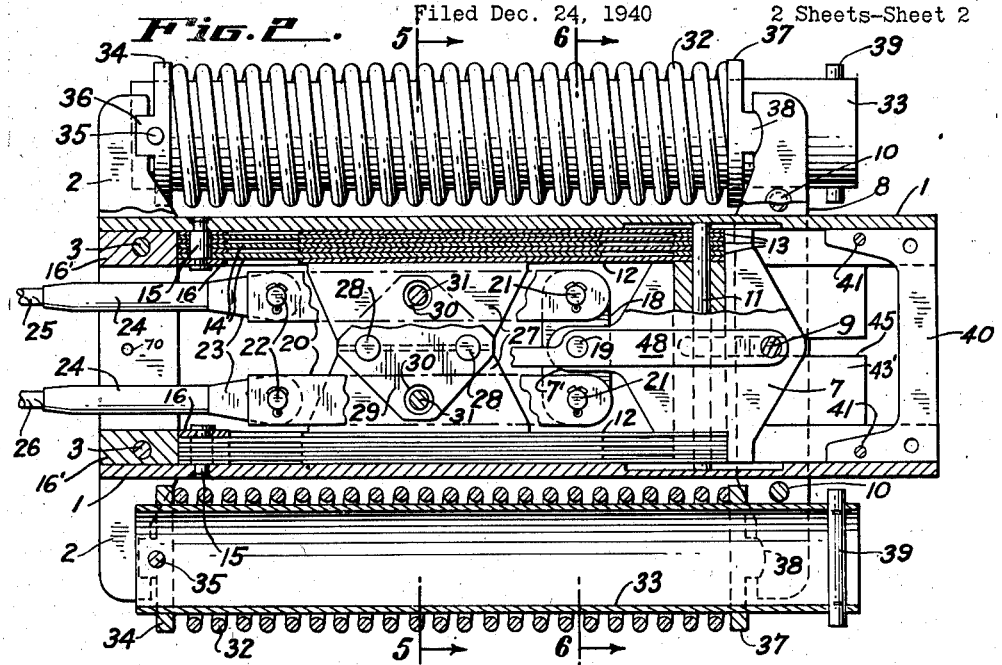
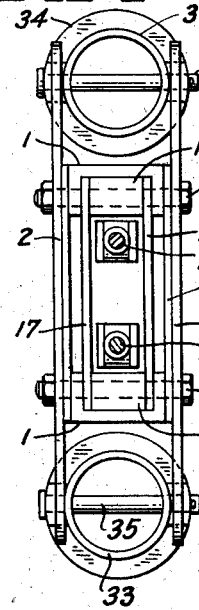 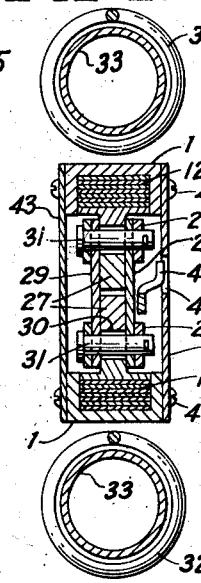 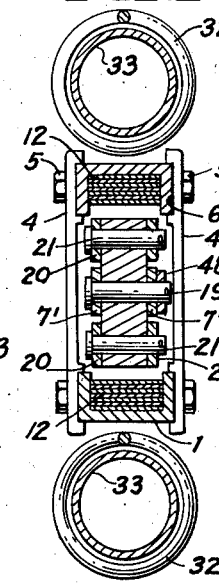 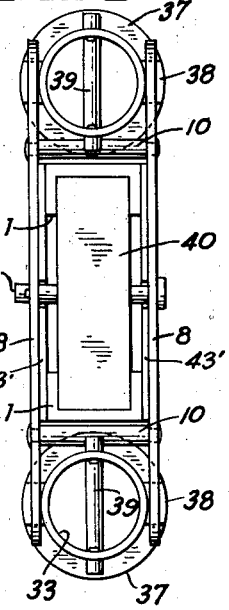
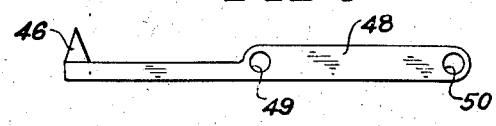
INVENTOR.
JOHN STURGESS
BY
ATTORNEY.

Patented Apr. 21, 1942

2,280,106

UNITED STATES PATENT OFFICE 2,280,106

CABLE TENSION CONTROLLER

John Sturgess, Glendale, Calif., assignor to Sturgess, Inc., Los Angeles, Calif., a corporation of California Application December 24, 1940, Serial No. 371,546

13 Claims. (Cl. 74—501)

This invention relates to operating cables, ropes, or wires as used to transmit motion to a device to be moved, such as a rudder, aileron, or other movable part of an airplane, or any other device, and which cables are normally maintained under tension though subject to much greater tension when work is imposed upon them, particularly when the work is alternately imposed on one or the other of a pair of such cables used to operate the desired device back and forth as may be desired.

The principal object of the invention is to provide an improved device which will automatically maintain the normal tension of the cables within required limits, to compensate for expansion or contraction of the structure upon which the cables are used, such as the fuselage of an airplane, or elongation or contraction of the cables themselves from the effect of heat, stretch of the cables, wear of idlers, etc., while at the same time permit either of a pair of cables to be subject to greatly increased working tension.

Another object of the invention is to provide a relatively simple, reliable, compact device for the aforesaid purpose.

Other objects and advantages of the invention will appear in the following description and accompanying drawings:

In the drawings:

Fig. 1 is a plan view of my cable tension controlling device shown in operative relation to a pair of control cables for maintaining them substantially at uniform tension when not under working load.

Fig. 2 is a larger scale view of the controller with the outer cover plate omitted, and portions of the frame, guides, and other parts broken away to reveal the operative relation of the parts.

Fig. 3 is an end view of Fig. 2 as seen from the right hand end thereof.

Fig. 4 is an end view of Fig. 2 as seen from the left hand end thereof.

Fig. 5 is a cross sectional view of Fig. 2 taken from the line 5—5 thereof.

Fig. 6 is a cross sectional view of Fig. 2 taken from the line 6—6 thereof.

Fig. 7 is a detached view of the temperature regulator indicator.

Fig. 8 is a diagrammatic drawing showing a second way of equipping a pair of control cables with the device.

Fig. 9 is a diagrammatic drawing showing a third way of equipping a pair of control cables with the device.

Before going into a detailed description of the drawings, it will aid in understanding the description to state that the invention comprises a device having two elongated telescopically slidable parts or members—that is, one member is slidable longitudinally within the other; the outer member is arranged for anchoring to a fixed support, and the inner member is provided with means at one end for securing the ends of a pair of cables to be tensioned, in a manner so that the pull of the cables will tend to slide the inner member along the outer anchored member, and in so doing will compress a spring fulcrumed on the outer member until the spring balances the normal or initial pull or tension of the cables when at rest. The spring constantly takes up any slow tension variations in the cables caused by expansion, contraction of the cables, and/or the structure upon which they are mounted, but in event of any decided change in the pull of either cable, as when force is applied to either to accomplish some desired work movement, means is provided for instantly locking the inner member to the outer member so that no further relative sliding of the members can take place until the tension of the cables is restored to normalcy.

To carry this out the two cables are attached to the inner sliding member through the intermediary of a pivoted rocker, to the opposite ends of which they are linked in such a manner that upon any quick uneven pull being applied to the cables as would be occasioned by operating the rudder or other control of an air-craft, the cables at once operate said rocker and thereby force a pair of friction jaws carried by the inner sliding member, to grip the outer member and thus temporarily, (for the duration of the unequal pull on the cables) lock both parts together so that during the operative pulling of either of the cables, they would both be locked off of any influence of the cable tensioning spring of the device.

The friction grip set up by the jaws is attained through the use of a plurality of interleaved friction strips to which the jaw pressure is applied, every other strip being secured at one end to the inner sliding member, and the remaining strips at the opposite end to the outer or anchored member.

In the drawings, the outer member comprises a pair of long channel guides 1 arranged in spaced relation with hollow sides confronting, and rigidly secured in such relation by a pair of transversely extending flat arms 2, passing entirely across the outer edges of the channels and held in place by through bolts 3, and further secured by any desired number of flat spacing bars 4 (see Fig. 1) which may be welded to the channels or held in place by short cap screws 5, and the spacers may additionally be milled out or formed with retaining grooves 6 into which the channels fit, to thus relieve the screws from excessive shear, a feature which may also apply to the flat bars 2.

Within the thus secured confronting channel guides forming the outer member, is the longitudinally slidable inner member and which comprises a yoke 7 which slides freely within the channel guides 1 and to the outer central end of which is pivoted a pair of flat arms 8 which are similar to arms 2 and likewise extend across and beyond the channels 1, but instead of being secured to the channels are free for sliding along the outer sides of the channel legs while being also rockable on pivot bolt 9 which alone secures them to the yoke 7. The arms 8 are preferably tied together by shouldered pins or rivets 10.

At the inner end of the yoke 7 is a transversely extending pin 11 which at opposite ends passes freely through holes in a plurality of thin flat metal strips 12 which extend along the space within the channel guides 1 and are spaced on pin 11 by washers 13 to provide spaces for a plurality of similar strips 14 which are freely interleaved with strips 12 and similarly spaced and anchored at their remote ends to the channel guides 15 by shoulders rivets 15 passing through rectangular anchor plates 16 braced against displacement by end blocks 16' and cross strips 17 secured by pins or bolts 3.

Strips 12 and 14 are thin, flexible and perfectly smooth on both sides, and the inner walls of the channel guides are likewise smooth, so that all of the interleaved strips are free to slide against one another and the outer ones against the channels, as the yoke is slid back and forth between the guiding channels, but if pressure were applied to force the interleaved strips in tight contact the great friction set up would at once lock the yoke against any sliding within the channels from any force within the capacity of the particular size device.

To set up such pressure on the interleaved friction strips from the relative movement of a pair of tensioned cables, I mount a rocking lever 18 transversely between the inner ends 7' of the yoke, on a pin 19, and at the ends of the rocker are two pairs of long links 20 which extend along adjacent the channel guides. These links are pivotally mounted on rocking lever 18 by means of pins 21 and at their free ends they are provided with holes through which extend pins 22 which pivotally secure thereto the ends 23 of cable connections 24 of cables 25 and 26.

Positioned between the links 20 are a pair of jaw plates or pressure plates 27 which are placed in confronting relation and at their outermost edges are in contact with the innermost of the friction strips 12, and are slightly spaced at their inner confronting edges and in contact with a pair of transversely extending pins or rollers 28, which are seated in half round sockets or bearings formed in the confronting edges of the jaw plates. These pins 28 extend beyond both sides of the jaw plates and pass through bearing apertures in diamond shaped plates 29 disposed in contact with and on opposite sides of the jaw plates. The jaw plates are also provided with intermediately disposed holes 30 through which loosely pass a pair of pins 31 which extend through fitting apertures in both links 20. All pins are secured from displacement by suitable cotters or heads at their ends, as indicated on some of the pins. It should be noted that with rocker 18 standing at right angles across the longitudinal center line of the device, the jaw plates will just fit between the two inner friction strips 12 but will not exert any pressure thereagainst, and so that under these conditions the inner member is free to slide back and forth within the outer member, and the interleaved strips are also freely slidable in their interleaved arrangement. However, upon moving either set of links 20 (the upper or lower set in Fig. 2 as viewed in the drawings) longitudinally with respect to the other set of links, the rocker 18 will be slightly tipped out of its normally right angle position, and in so doing will also similarly rock the diamond shaped plates 29 through their pins 31, and by transmitting this motion to roller pins 28 will force one of the jaw plates toward one set of friction strips and the opposite plate toward the opposite set of friction strips, to thus at once set up the total friction gained through their multiple surface contact and thereby lock the inner member from any sliding within the outer member. It will be understood that since the members substantially fit in their free position, such rocking movement of rocker 18 and diamond plates 29 is very slight indeed as the total clearance involved between all of the plates is only sufficient to permit them to have free movement when the rocker 18 is in its right angle position with respect to the longitudinal center line of the device. As soon as the right angle position of the rocker 18 is restored, the frictional grip of the interleaved plates at once ceases and the inner member is again free for bodily sliding adjustment within the outer member.

The spacer bars 4 prevent sliding of the channel guides during the application of the frictional grip, but manifestly they may be omitted if the channel guides are made sufficiently rigid.

In order to balance the pull due to the normal or initial tension desired in cables 25 and 26, the inner member is held against sliding due to this pull by a pair of heavy coiled compression springs 32, which react between the arms 2 fixed to the outer member, and the arms 7 pivotally mounted on the inner member. These springs are each shown supported around a hollow cylinder 33 which functions as a carrier for the spring and also provides a unit assembly to aid in installing the springs on the device, as the springs in their free state would be about twice as long as shown in the drawings so as to provide when compressed to the point shown the proper balancing force for the initial pull or tension of the cables desired.

In order to hold the springs in partially compressed position on their tubular supports, a collar 34 is pinned at 35 through one end of the tube 33 and this collar is formed with a substantially rectangular lug 36 fitting within a similarly formed notch in the arms 2. At the opposite end of the spring is a similar collar 37, also provided with a substantially rectangular lug 38, but this collar is free to slide along the tubular support, but is stopped from coming off by means of a transversely extending pin 39 adjacent the end of the tube, the pins as previously stated all being provided with cotters or other suitable means to prevent displacement.

With the device in the form described, and assuming that it was not connected up operatively with the cables and anchor, it would be evident that it would be possible to slide the inner member outwardly (to the right) beyond the point where collars 37 arrived at their stop pins 39, and thus permit easy removal of the tubular supports as a sub-assembly. However, to prevent any such sliding of the inner member and the consequent accidental dropping out of the spring assemblies from the device, suitable stops may be provided to prevent such excessive and unnecessary movement of the inner member, but which stops may of course be removed when inspecting or cleaning the device. Such stops are here shown as U-shaped plate 40, positioned within the right hand ends of the channel guides and held in place as by rivets 41 and/or the anchorage bolts which pass through holes 41' in the channels. This plate 40 may also function as a transverse spacer or tie plate to aid in rigidly maintaining the channels in their spaced relation. Any other form of stop may also be used; in fact, a simple form of stop would be the extension of pins 11 into central grooves 42 milled within the channel members, and which grooves would be long enough to permit normal sliding action of the inner member, but prevent any excessive outward sliding action.

It is also desirable, though not absolutely essential, that a pair of thin cover plates be applied to opposite sides of the channel frame to protect the frictional strips and leverage movement within from possible dirt and dust. Such plates are indicated in the various drawings at 43 and 43', and may be secured to the channels by very short screws 44, and at the right hand end the sections 43' will necessarily be slotted as at 45 to permit movement of pin 9 upon which the transversely extending arms 8 are pivotally mounted.

In practical use for aircraft cables, it has been found that a total sliding action of the members of about from an inch and a half to two inches will take care of all requirements throughout the hot and cold temperature range to which aircraft apparatus is exposed, and since the compression of the springs by the normal or initial tension of the cables 25 and 26 will be considered the mean position, it is desirable to have some kind of an indicator to show whether this original adjusted position is maintained or not. I therefore provide an indicator at 46 which slides in a groove 47 in the cover plate and indicates the mean, hot and cold position. It is of course assumed that the operating cables themselves, or the anchoring cables, or rods, or both, are provided with turn buckles or other adjusting means for setting up the initial tension in the operating cables, and that such turn buckles or adjusting means shall be used to bring the pointer to mid-position at mean temperature. This pointer may be secured to any portion of the inner slidable member, but in the illustration is presumed to be of the elongated form shown in Fig. 7 at 48 and apertured at 49 and 50 to fit over the ends of pins 19 and 9 respectively for movement therewith upon sliding of the inner member relative to the outer member. The pointer may be attached in any other way to the inner member.

In installing the device several different means of hooking it up may be resorted to. For instance, in Fig. 1 the outer member is shown anchored rigidly to a fixed bracket 51 and the cables 25 and 26 are shown, not as operative cables, but as pulley cables extending respectively to pivotal connections 52 and 53, respectively with levers 54 and 55 in turn pivotally anchored at 56 and 57, and which levers carry idler pulleys 58 and 59, over which the actual operating cables B and C extend. By this means a compounding or pulley effect may be obtained, depending on the amount of turn taken by the operating cables over the pulleys 58 and 59, thus permitting stiffer springs 32 to be used in the controller and with lesser movement than though the controller were used in direct connection with the operating cables as shown in Figs. 8 and 9. A hole 70 in arms 2 provides for attachment of a lateral stay rod or wire if desired.

In Fig. 8 the controller is designated A and shown as being directly connected to the operating ropes B and C which pass over pulleys 60 and 61 mounted at the ends of a rocker 62, operated by a control rock shaft 63. The cables B and C pass from the rock shaft over or under any desired number of idler pulleys 64 to the control element to be rocked, and whereat they are secured in the well known manner at equidistant points from its rocking center.

In Fig. 9 the controller A is shown applied to the opposite ends of the cables, i. e. the portions adjacent the control being operated. In this illustration the rocker 65 on the rock shaft 66 is fixed to the control element to be rocked and the cables B and C pass over pulleys 67 and 68 at the outer ends of the rocking element 65 and then extend (to the left in this view over any desired number of guide pulleys not shown) to the cockpit of the craft for operating by the pilot in the usual manner.

In Fig. 8 the controller is shown as pivotally anchored at a central point 69, whereas in Fig. 1 it is shown rigidly anchored at the ends of its two channel guides.

It should be noted that while I have shown the controller as arranged to control the tension of the opposite cables of a working pair of control cables, attention is called to the fact that in some aircraft installations, instead of using a single cable at each end of a rocker arm, twin cables are used as an additional element of safety. Such twin cables take the place of the single cables shown in the drawings. In such cases it is manifest that the twin cables may be secured to the controller in the same manner as the single cables.

Also while I show the apparatus controlling the tension in operating "cables," it is evident that it will operate in the same manner with ropes, wires, or chains, which may be used for operating movable parts of aircraft or other apparatus through the medium of rocker joints or their equivalents, and hence in my claims the word "cables" is intended to apply equally to such other tension transmitting devices.

Having thus described my invention and illustrated some of its applications to control cables, it will be evident that many changes in detail construction may be made within the spirit of the invention and as may follow within the scope of my appended claims.

I therefore claim:

1. A tension controller for control cables comprising two adjacent members, means mounting said members for relative movement, means adapted for securing the ends of a pair of cables to one of said members, spring means interposed between said members for balancing the pull of said cables, a plurality of interleaved plates forming a normally released friction clutching means for locking said members against relative movement, and means actuated by unequal pull on said cables throwing said friction clutching means into engagement.

2. An apparatus of the character described, provided with two parts relatively movable along one another, the first of said parts formed and adapted for anchoring to a support, means adapted for securing a pair of cables to the second of said parts, spring means reacting between said parts balancing a pull on said cables when the pull is even and the first part anchored, and interleaved friction plate means frictionally locking said parts against relative movement when the pull on the cables is greater on either one than on the other.

3. A tension controller for control cables comprising a yoke member provided with means for the attaching of the ends of a pair of cables, a guiding member along which said yoke member is slidable, a compression spring opposing the one-way sliding of said yoke relative to said guiding member due to tension or pull of said cables, and clutch means including a plurality of interleaved friction strips carried by said yoke member and said guide member, and means for clamping said interleaved strips together actuated by uneven pull on said cables arranged for frictionally locking said yoke against sliding along said guiding member, said clutch means being normally released upon the pull of the cables being balanced.

4. A tension controller for control cables comprising an outer frame member providing elongated guides, an inner member slidable along said guides, means adapted for securing the ends of a pair of cables to said inner member, a pair of coiled compression springs along the outer sides of said frame member, means on said frame member engaging one end of each of the springs, and means carried by said inner member engaging the opposite ends of the springs in a manner whereby a pull on said cables tending to slide said inner member when the outer frame member is held is balanced by the compression of said springs, and means carried by said inner member operated by unequal pull on said cables locking the inner member against sliding action during such unequal pull only.

5. In a structure as set out in claim 4, an elongated supporting and guiding member within each coiled spring provided with means confining the spring under some compression thereon while providing for further compression of the springs upon the relative sliding of the inner and outer members.

6. In a structure as set out in claim 4, an elongated supporting and guiding member within each coiled spring provided with means confining the spring under some compression thereon while providing for further compression of the springs upon the relative sliding of the inner and outer members and stop means on said outer frame limiting the sliding movement of said yoke member in direction of releasing said springs so as always to maintain a compression thereon.

7. A tension controller for control cables comprising an outer frame member having a pair of spaced confronting channel guides, a plurality of superimposed elongated friction strips positioned in each channel and all anchored at one end to the channel adjacent one end thereof with free ends extending toward the opposite end of the channel, a yoke member slidable along the channels provided at opposite edges with a plurality of superimposed elongated friction strips all anchored at one end thereto lying within the channels respectively and interleaved with the channel strips so as to be slidable between each other as the yoke is slid back and forth along the channel guides, means for securing a pair of cables to said yoke for pulling the same along the channels, compression spring means arranged in opposition to the pull of said cables, and means interposed in the attachment of said cables to said yoke operated by unequal pull on said cables for forcing said interleaved friction strips together for thereby frictionally locking said yoke against sliding during said unequal pull.

8. A tension controller for control cables comprising an outer frame member having a pair of spaced elongated guides, an inner yoke member slidable along said guides, means for securing the ends of a pair of cables to said yoke member, a pair of coiled compression springs arranged along the outer sides of said guides respectively, a pair of arms secured across one end of said frame member supporting one end each of said springs, a pair of arms secured across said yoke member engaging the opposite ends of said springs, a rocker carried by said yoke member, means including links pivoted to the ends of said rocker for attaching the ends of a pair of cables, and means operated by unequal pull of said cables and consequent rocking of said rocker for locking said yoke member against sliding along said guide during said unequal pull.

9. A tension controller for control cables comprising an outer frame member having a pair of spaced elongated guides, an inner yoke member slidable along said guides, means for securing the ends of a pair of cables to said yoke member, a pair of coiled compression springs arranged along the outer sides of said guides respectively, a pair of arms secured across one end of said frame member supporting one end each of said springs, a pair of arms secured across said yoke member engaging the opposite ends of said springs, a rocker carried by said yoke member, means including links pivoted to the ends of said rocker for attaching the ends of a pair of cables, and means operated by unequal pull on said cables and consequent rocking of said rocker for locking said yoke member against sliding along said guide during said unequal pull, said last mentioned means including a pair of separable jaw plates adapted to be forced toward engagement with said guides respectively.

10. A tension controller for control cables comprising an outer frame member having a pair of spaced elongated guides, an inner yoke member slidable along said guides, means for securing the ends of a pair of cables to said yoke member, a pair of coiled compression springs arranged along the outer sides of said guides respectively, a pair of arms secured across one end of said frame member supporting one end each of said springs, a pair of arms secured across said yoke member engaging the opposite ends of said springs, a rocker carried by said yoke member, means including links pivoted to the ends of said rocker for attaching the ends of a pair of cables, and means operated by unequal pull on said cables and consequent rocking of said rocker for locking said yoke member against sliding along said guide during said unequal pull, said last mentioned means including a second rocker operatively connected to said links, and a pair of separable jaw plates operated by said second rocker adapted to be forced toward engagement with said guides respectively.

11. In a structure as set out in claim 4, means for balancing the force of the two springs when under compression.

12. In a structure as set out in claim 4, means at spaced points positively locking said guides in spaced relation.

13. In a structure as set out in claim 8, a cover plate secured to opposite sides of said outer frame covering said yoke and associated parts set out, a slot in one of the cover plates with indicia therealong, and a pointer projecting from said slot with its inner end connected to said yoke for indicating the relative position of the same.

JOHN STURGESS.